US009883358B2

(12) United States Patent
Kalkounis et al.

(10) Patent No.: US 9,883,358 B2
(45) Date of Patent: Jan. 30, 2018

(54) ELECTRONIC DEVICE AND METHOD OF DETERMINING SUGGESTED RESPONSES TO TEXT-BASED COMMUNICATIONS

(71) Applicant: BlackBerry Limited, Waterloo (CA)

(72) Inventors: Nicholas Kalkounis, Toronto (CA); Shiladitya Sircar, Ottawa (CA)

(73) Assignee: BlackBerry Limited, Waterloo (CA)

( * ) Notice: Subject to any disclaimer, the term of this patent is extended or adjusted under 35 U.S.C. 154(b) by 274 days.

(21) Appl. No.: 14/707,895

(22) Filed: May 8, 2015

(65) Prior Publication Data

US 2016/0330597 A1 Nov. 10, 2016

(51) Int. Cl.

| G06F 15/16 | (2006.01) |
|---|---|
| H04W 4/12 | (2009.01) |
| G06F 17/27 | (2006.01) |
| G06F 17/28 | (2006.01) |
| H04L 12/58 | (2006.01) |
| G06F 17/30 | (2006.01) |
| G06N 7/00 | (2006.01) |
| H04W 4/02 | (2009.01) |
| H04W 76/02 | (2009.01) |

(52) U.S. Cl.
CPC ............ *H04W 4/12* (2013.01); *G06F 17/276* (2013.01); *G06F 17/2785* (2013.01); *G06F 17/2881* (2013.01); *G06F 17/3043* (2013.01); *G06F 17/3053* (2013.01); *G06N 7/005* (2013.01); *H04L 51/02* (2013.01); *H04W 4/02* (2013.01); *H04W 76/02* (2013.01)

(58) Field of Classification Search
CPC ................................. H04L 51/02; H04W 4/12

USPC ......................................................... 709/206
See application file for complete search history.

(56) References Cited

U.S. PATENT DOCUMENTS

| 6,721,416 B1* | 4/2004 | Farrell .................... H04M 3/51 379/13 |
|---|---|---|
| 8,402,096 B2* | 3/2013 | Affronti ............... G06Q 10/107 455/466 |
| 8,996,639 B1 | 3/2015 | Faaborg et al. |
| 9,043,198 B1* | 5/2015 | Black .................... G06F 17/273 704/9 |
| 9,235,978 B1* | 1/2016 | Charlton ........... G06F 17/30867 |
| 2010/0100371 A1 | 4/2010 | Yuezhong et al. |
| 2010/0184453 A1 | 7/2010 | Ohki |
| 2011/0246575 A1* | 10/2011 | Murayama ........ G06F 17/30011 709/204 |

(Continued)

OTHER PUBLICATIONS

Extended European Search Report for Application No. EP16168063.2, dated Sep. 27, 2016, 7 Pages.

(Continued)

*Primary Examiner* — Phuoc Nguyen
(74) *Attorney, Agent, or Firm* — Borden Ladner Gervais LLP; Todd Keeler (57) ABSTRACT

A method of responding to a text-based communication on a portable electronic device includes receiving the text-based communication at the portable electronic device, performing textual analysis on the text-based communication to determine a set of possible responses, for each possible response of the set of possible responses, ranking the possible responses based at least on auxiliary information at the portable electronic device, and selecting a first possible response as a suggested response based on the ranking of the possible responses.

15 Claims, 9 Drawing Sheets

(56) References Cited

U.S. PATENT DOCUMENTS

| | | | | |
|---|---|---|---|---|
| 2012/0011208 A1* | 1/2012 | Erhart | ............. | G06Q 10/107 709/206 |
| 2013/0253910 A1* | 9/2013 | Turner | ............. | G06F 17/274 704/9 |
| 2014/0108562 A1* | 4/2014 | Panzer | ............. | G06Q 50/01 709/206 |
| 2014/0244622 A1* | 8/2014 | Lindsay | ............. | G06F 3/0237 707/722 |
| 2014/0316767 A1* | 10/2014 | Fitterer | ............. | G06F 17/2775 704/9 |
| 2014/0316856 A1* | 10/2014 | Williams | ............. | G06Q 30/0204 705/7.32 |
| 2014/0365126 A1* | 12/2014 | Vulcano | ............. | G01C 21/36 701/533 |
| 2015/0113435 A1 | 4/2015 | Phillips | | |
| 2015/0256675 A1* | 9/2015 | Sri | ............. | H04M 3/5183 379/265.09 |
| 2016/0179967 A1* | 6/2016 | Sa | ............. | G06F 17/30687 707/730 |
| 2016/0189239 A1* | 6/2016 | Bhagwan | ............. | G06Q 30/0269 705/14.66 |
| 2016/0224524 A1* | 8/2016 | Kay | ............. | G06F 17/276 |

OTHER PUBLICATIONS

Printout from website: http://blog.smartthings.com/how-to/using-hello-home-modes/ published Apr. 3, 2014.

\* cited by examiner

ELECTRONIC DEVICE AND METHOD OF DETERMINING SUGGESTED RESPONSES TO TEXT-BASED COMMUNICATIONS

TECHNICAL FIELD

The present disclosure relates to electronic devices including, but not limited to, portable electronic devices and controlling the display of information.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth® capabilities.

Portable electronic devices such as PDAs or smart telephones are generally intended for handheld use and ease of portability. A touch-sensitive display, also known as a touchscreen display, is particularly useful on handheld devices, which may be small and have limited space for user input and output. With increased functionality of such portable electronic devices, the amount of information available for display continues to increase.

Improvements in devices are desirable.

BRIEF DESCRIPTION OF THE DRAWINGS

Embodiments of the present disclosure will now be described, by way of example only, with reference to the attached figures, in which.

DETAILED DESCRIPTION

The following describes an electronic device and a method of determining suggested responses to text-based communications utilizing auxiliary information on a portable electronic device. The method includes receiving the text-based communication at the portable electronic device, performing textual analysis on the text-based communication to determine a set of possible responses, for each possible response of the set of possible responses, ranking the possible responses based at least on auxiliary information at the portable electronic device, and determining a first possible response as a suggested response based on the ranking of the possible responses.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth.

Figure 1:
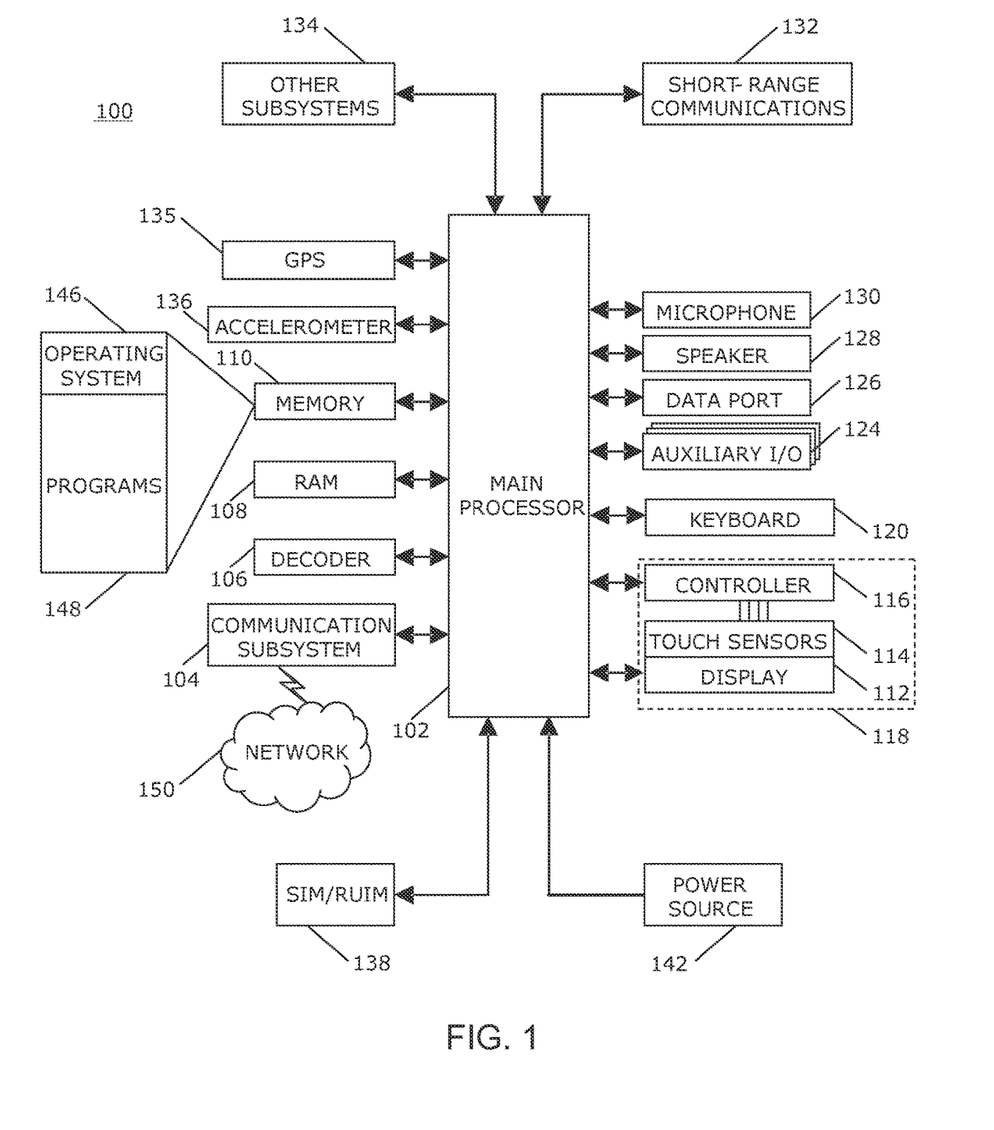
FIG. 1 is a block diagram of an example of a portable electronic device in accordance with the disclosure.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132, a global positioning system (GPS) 135, and other device subsystems 134. The speaker 128, also referred to as an earpiece speaker, is utilized to output audible signals when a user's ear is very close to the speaker 128. Although not shown, the processor may also interact with a loudspeaker, for example, for handsfree use. The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. Alternatively, or in addition, the keys of the keyboard may include touch sensors coupled to a controller to detect touch input thereon.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, one or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

Figure 2:
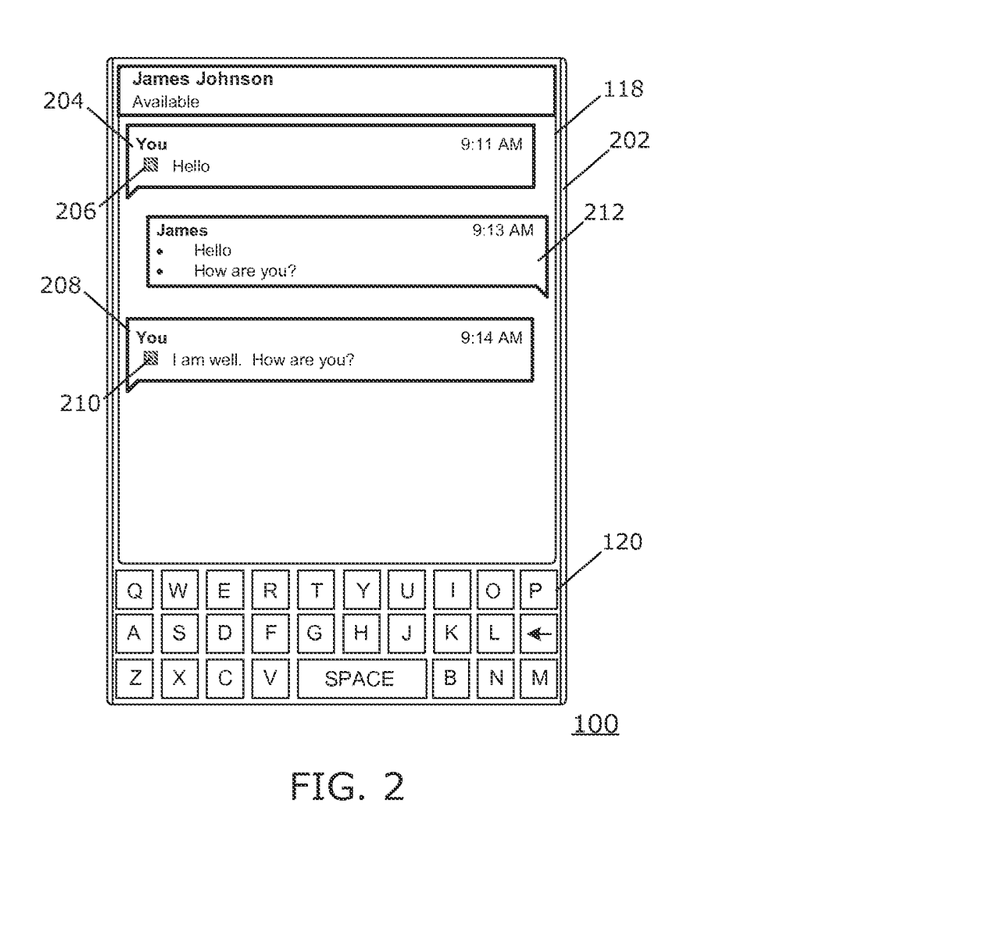
FIG. 2 is a front view of the an example portable electronic device including text-based communications in accordance with the disclosure.

An example of an electronic device 100 is shown in FIG. 2. In the example of FIG. 2, the electronic device 100 includes a housing 202 in which the touch-sensitive display 118 is disposed. The housing 202 is utilized to enclose components such as the components shown in FIG. 1. The keyboard 120 is disposed below the touch-sensitive display 118 in the orientation illustrated in FIG. 2.

For the purpose of the example of FIG. 2, a series of text-based communications that have been sent and received at the portable electronic device 100 is displayed on the touch-sensitive display 118 of the portable electronic device 100. The text-based communications are sent and received via an application of the portable electronic device 100. For example, the text-based communications may be sent and received via an email application, a short message service (SMS) application, a multimedia messaging service (MMS) application, or any other application that facilitates sending and receiving text-based communication at the portable electronic device 100.

The sent and received text-based communications shown in the example of FIG. 2 relate to a written conversation. The written conversation of the example shown in FIG. 2 includes two text-based communications 204, 208 sent from the portable electronic device 100, and one text-based communication 212 received at the portable electronic device 100.

The text-based communications 204, 208, 212 each have associated content. The content is the text that is included in a text-based communication. For example, the content associated with text-based communication 204 is "Hello". The content associated with text-based communication 208 is "I am well. How are you?"

The text-based communications sent from the portable electronic device 100 may be displayed with a confirmation indication. For example, text-based communication 204 includes a confirmation indication 206 in which an "R" is displayed. The displayed "R" may indicate that the text-based communication 204 has been read by the recipient. Text-based communication 208 includes a confirmation indication 210 in which a "D" is displayed. The displayed "D" may indicate that the text-based communication 208 has been delivered to the recipient but has not yet been read. In other examples, other confirmation indications may be utilized.

The written conversation in the example shown in FIG. 2 is with one other party. A contact profile may be associated with the party. The contact profile may be stored in the portable electronic device 100. For example, the contact profile may be stored in a contact database associated with a contact application. The contact database may be stored in, for example, a memory 110 of the portable electronic device 100. In other examples, the written conversation may include more than one other party. Contact profiles may be associated with some or all of the parties to a written conversation that includes more than one party.

One of the parties to a written conversation may be a smart device that is paired to the portable electronic device 100, either directly or over a network. Smart devices are devices that operate autonomously to connect to and share data with other devices or applications via a wired or wireless connection. For example, smart devices includes devices that may be queried for data and, in response to receiving the query, transmit data via a wireless protocol such as Bluetooth™, near field communication (NFC), Wi-Fi, or cellular. Examples of smart devices include vehicle navigation systems, home automation systems, smart home alarm systems, and smart thermostats.

A contact profile may be associated with a smart device. The contact profile may be included in the contact database associated with the contacts application. The portable electronic device 100 may communicate with the smart devices via the network 150 by utilizing the communication subsystem 104, or may communicate directly with the smart device utilizing the short-range communications subsystem 132.

Figure 3:
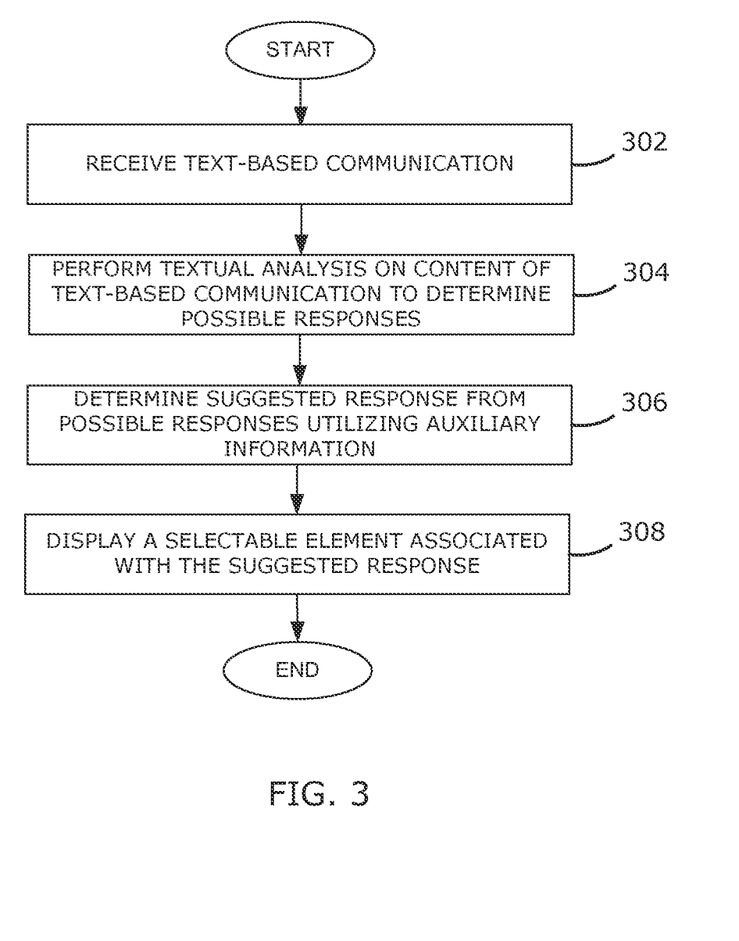
FIG. 3 is a flowchart illustrating a method of determining a suggested response to text-based communications on the portable electronic device of FIG. 1 in accordance with an embodiment.

A flowchart illustrating a method of determining a suggested response to a text-based communications received at an electronic device 100 is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the electronic device to perform the method may be stored in a computer-readable storage medium, such as a non-transitory computer-readable medium.

A text-based communication is received at the portable electronic device 100 at 302. The text-based communication may be, for example, an email, a SMS message, or a MMS message received via any application of the portable electronic device 100 that facilitates the sending and receiving of text-based communications.

Textual analysis is performed on the content of the text-based message at 304 to determine a set of possible responses to the text-based communication. Textual analysis may be performed by, for example, passing the content of the text-based communication through a natural language text-analysis algorithm. The natural language text-analysis algorithm may utilize, for example, semantic analysis to determine the meaning of the text-based communication based on the syntactic structure of the content. The natural language text-analysis algorithm compares the results of the semantic analysis with predefined lists of phrases, verbs and actions in order to determine a set of possible responses to the text-communication. The set of possible responses may be, for example, an unbounded list of all possible responses to the text-based communication. The textual analysis may also determine, for example, mood or sentiment expressed in the text-based correspondence, the subject matter of the text-based communication, whether the text-based correspondence asks a question.

One or more suggested responses are determined at 306 from the set of possible responses by utilizing auxiliary information on the portable electronic device 100. Auxiliary information is information or data that is stored on the portable electronic device 100 or determinable by the portable electronic device 100. The auxiliary information is utilized, at least in part, to rank the possible responses with respect to the likelihood that each possible response is a response that the user is likely to provide in response to the text-based communication. Ranking the possible responses may include, for example, determining a probability associated with each of the possible responses based at least in part on the auxiliary information. The one or more determined suggested responses may be the most probable of the possible responses. For example, the determined suggested responses may be the possible responses that have an associated probability that meets or exceeds a threshold probability.

In an example, probability based machine learning algorithms are utilized determine the probabilities associated with the possible responses by associating a weighting factor to each possible response. The type of probability based machine learning algorithm utilized may vary depending on the possible responses. Suggested responses may be determined based on a weighting factor meeting or exceeding a threshold.

Auxiliary information may include time, date, day of week, information associated with contacts including names, addresses, and phone numbers, language, location, the connection type of the portable electronic device 100, for example Wi-Fi, wired, cellular, Bluetooth, and NFC, the relationship between the sender and the recipient such as, for example, friends, relatives, or acquaintances, and previous text-based communications sent by the portable electronic device 100. The auxiliary information may also include information determined by the textual analysis, for example, a mood or sentiment expressed in the text-based communication, whether the text-based communication is asking a question, and the subject matter that the text-based communication relates to. Auxiliary information may include information associated with a person information manager (PIM) application, including, for example, data stored in an events database associated with a calendar application of the portable electronic device 100, or data stored in the contacts database associated with a contacts application. Auxiliary information may include information determined by sensors included in the portable electronic device 100 including, for example, the GPS 135, accelerometer 136, or any other sensor included in the portable electronic device 100. Auxiliary information may include information determined from metadata of the text-based communication including, for example, location that the text-based communication was sent from.

In an example, the auxiliary information utilized to determine the suggested response may be, at least in part, a user's availability. A user's availability may be determined by data stored in an events database associated with a calendar application of the portable electronic device 100. In this example, if the text-based communication is a request for a meeting on a particular date, the set of possible responses determined by the textual analysis may include various times for the meeting on the particular date. The user's availability may be utilized to associate a relatively low probability with possible responses that include times that conflict with a stored calendar event compared with the probability associated with possible responses that include times that do not conflict with stored calendar events. Thus, the suggested responses are determined such that a suggested meeting time does not conflict with a user's prior engagements as determined by data stored in an events database associated with a calendar application.

In another example of a suggested response to a text-based communication that requests a meeting, the auxiliary data may include any of historical data stored in the events database that is associated with of similar previous meetings. The historical data may include, for example, the time of day, location, the attendees of the meeting, date, and the user's relationship with the attendees of the meeting. The auxiliary data may be utilized to determine a suggested response from the set of possible responses by associating a relatively higher probability to possible responses having any of, for example, time, date, location, and attendees that corresponds to the historical data compared to the probability associated with possible responses that do not have a time, date, location, or attendees that corresponds with the historical data.

In another example, the auxiliary data utilized to determine suggested response includes, at least in part, a current location of the portable electronic device 100. The location of the portable electronic device 100 may be determined by, for example, the GPS 135 of the portable electronic device 100 or utilizing internet protocol (IP) address information for the portable electronic device 100. In this example, if the received text-based communication is a query of the recipient's current location, the set of possible responses determined by textual analysis may include the location of the portable electronic device 100 based on the best available location information. The suggested response may be the possible response that corresponds to the location of the portable electronic device 100 with the best resolution. For example, GPS 135 may be identified as providing location information with the best resolution. If GPS 135 is available at the portable electronic device 100, a determination made by GPS 135 may be determined as the suggested response. If GPS 135 is not available, a determination of the location with a next best resolution may be determined as the suggested response such as, for example, a location determined using the IP address of the portable electronic device 100. The portable electronic device 100 may include an application program interface (API) that determines the best available location information. The API may be stored, for example, in the memory 110.

In another example, the auxiliary information utilized to determine the suggested response includes, at least in part, data associated with a contact profile stored in contacts database of the portable electronic device 100. In this example, if the received text-based communication is a request for further information of a contact, such as, for example, the contact's telephone number or address, the set of possible responses determined by textual analysis may include telephone numbers or addresses associated with contact profiles that match the requested contact. For example, if the textual analysis determines that the text-based communication is a query for information regarding a person named "Nick", the possible responses may be, for example, the contact information for all contacts stored in the contacts database associated with the name "Nick" and names similar to "Nick". In the case that more than one contact is included in the possible responses, additional auxiliary information may be utilized to determine a probability associated with each possible response. For example, a location of the portable electronic device 100 may be utilized to associate a higher probability with a contact located nearer to the portable electronic device 100, such as the same city or country, than a contact that is located further away, such as a different city or country. If, for example, only one contact profile is associated with the name "Nick", the requested information associated with this contact profile may be determined as the suggested response. Thus, the suggested responses may be determined based on the contact profile associated with the contact for which information was requested.

Although the above examples are described utilizing one or two sources of auxiliary data to determine probabilities associated with the set of possible responses, in general auxiliary data from any number of sources may be utilized to determine probabilities associated with the possible responses determined by the textual analysis.

Selectable elements associated with the suggested response are displayed at 308. Each suggested response may have an associated selectable element that is displayed on the touch-sensitive display 118 of the portable electronic device 100. The selectable elements are selectable by, for example, a touch detected at a location on the touch-sensitive display 118 associated one of the selectable elements. Determining a selection of a selectable element causes the associated suggested response to be sent to the by the portable electronic device 100. Thus, when a touch is detected on a selectable element, the associated suggested response is sent. Alternatively, or additionally, the selectable elements may be selected utilizing a cursor (not shown) controlled by a navigation device (not shown) of the portable electronic device 100, or any other suitable method of selecting a selectable element. If a user does not wish to send any of the suggested responses, the user may input a response utilizing, for example, the keyboard 120.

Upon selecting a selectable element associated with a suggested response, the suggested response may be sent in a text-based communication to the sender of the previously received text-based communication. Alternatively, the response may be sent to the sender of the received text-based communication as a modified confirmation indication, similar to the confirmation indications 206, 210 shown in FIG. 2.

Figure 4:
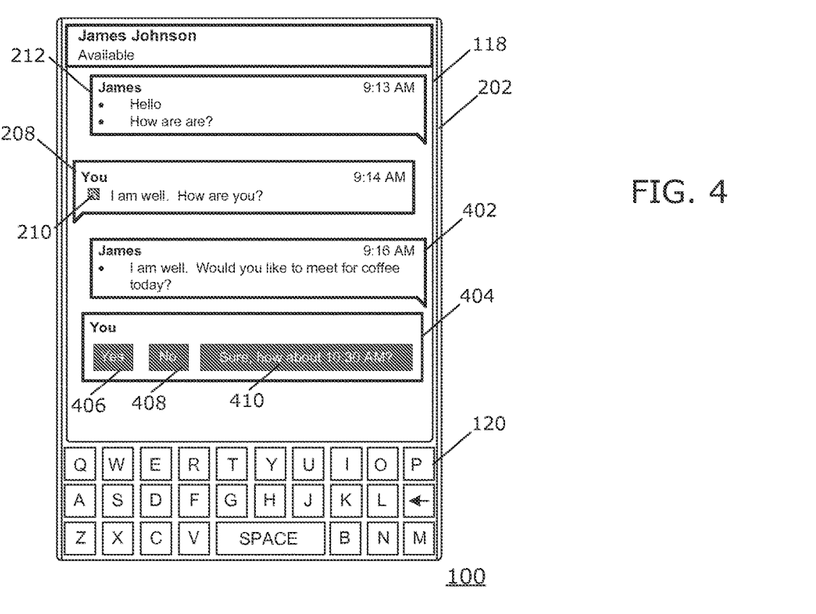
FIG. 4 through FIG. 6 illustrate examples of determining a suggested response to text-based communications in accordance with the flowchart of FIG. 3.
Figure 5:
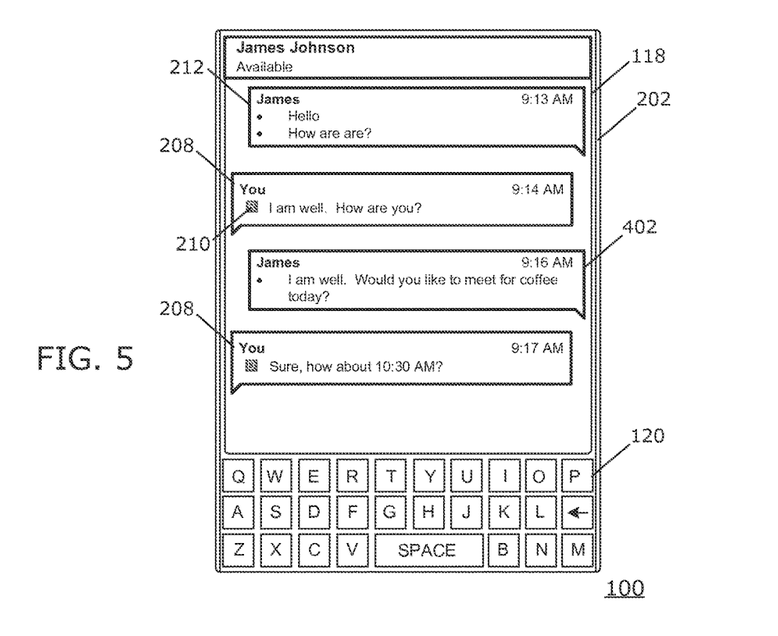
Figure 6:
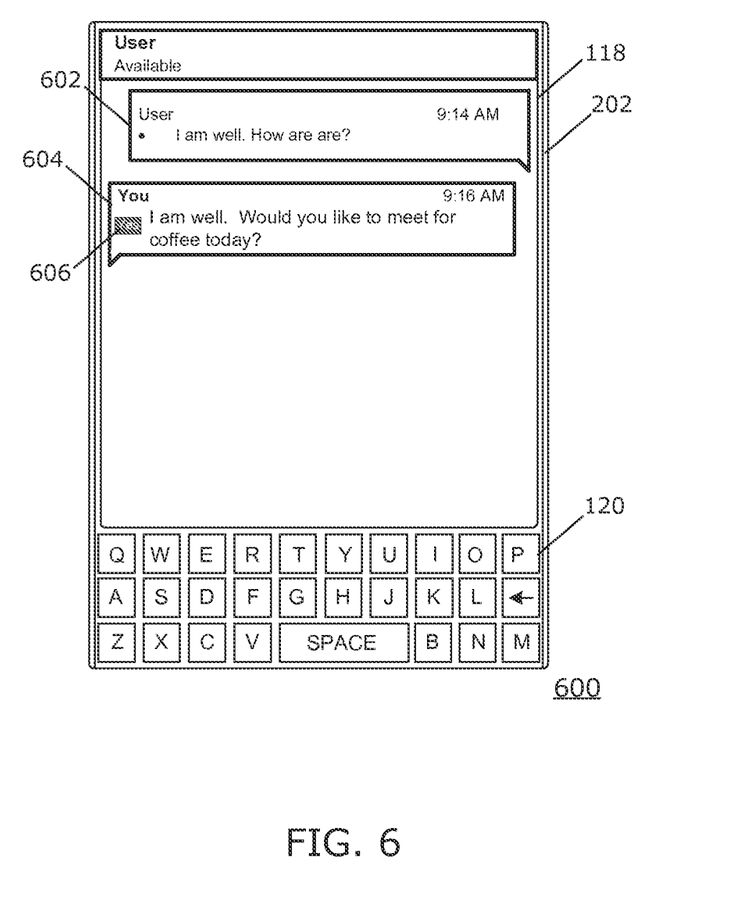

Reference is made to FIG. 4 to FIG. 6 with continued reference to FIG. 3 to describe examples of utilizing auxiliary information at a portable electronic device 100 to determine suggested responses to a text-based communication according to the method illustrated in FIG. 3.

Text-based communication 402 is received at the portable electronic device 100 at 302. The content of the received text-based communication 402 is "I am well. Would you like to meet for coffee today?"

The portable electronic device 100 performs textual analysis on the content of the received text-based communication 402 to determine a set of possible responses at 304. The set of possible responses determined by textual information may include various times to meet for coffee that day. In addition to the possible responses, the textual analysis may determine that the text-based communication 402 asks a question, that the question relates to a request to meet with the sender, and that the requested meeting is proposed for today.

Based on the determined possible responses, the portable electronic device 100 determines a suggested response from the set of possible responses utilizing auxiliary information at 306. In the example shown in FIG. 4, three suggested responses are determined: "Yes"; "No"; and "Sure, how about 10:30 AM?" In other examples, the number of suggested responses may be more or less than three. The suggested responses are determined by determining a probability associated with each possible response of the set of possible responses. For example, "Yes" and "No" may be determined to be suggested responses by associating relatively high probabilities to these possible responses compared to the other possible responses based on a determination that the content of the text-based communication 402 is a question for which "yes" and "no" are acceptable responses. The suggested responses may be selected as the possible responses having associated probabilities that meet or exceed a threshold probability. Alternatively the suggested responses may be the selected as the three possible responses having the highest associated probabilities.

"Sure, how about 10:30 AM?" may be determined to be a suggested response based auxiliary information that includes the user's availability as determined by data stored in an events database associated that is associated with events saved in a calendar application. For example, the user may only be available at 10:30 AM, and therefore a higher probability is associated with a possible response that includes a meeting time of 10:30 AM compared to possible responses including other meeting times. In effect, the suggested response may be determined by filtering the set of possible responses determined through textual analysis to include only the possible responses that include a meeting time that does not conflict with any events saved the calendar application.

Alternatively, or additionally, "Sure, how about 10:30 AM?" may be determined based on auxiliary information that includes similar meetings that the user has had in the past, as determined by data stored in the events database. The past meetings may be with the sender, or other meetings for coffee with other people. In this example, the most frequent time that the user meets the sender for coffee is 10:30 AM and, therefore, the possible response that includes a meeting time of 10:30 AM is associated with a relatively higher probability than possible responses that include other meeting times for which the user has meetings less frequently.

The suggested responses are displayed on the touch-sensitive display 118 at 308. A box 404 includes selectable elements 406-410 associated with the suggested responses. "Yes" is associated with selectable element 406, "No" is associated with selectable element 408, and "Sure, how about 10:30 AM?" is associated with selectable element 410. A user may select one of the selectable elements 406-410 by touching a location of the touch-sensitive display 118 associated with a desired one of the selectable elements 406-410. In response to detecting a touch at a location associated with one of the selectable elements 406-410, the portable electronic device 100 sends the suggested response associated with the selected selectable element 406-410.

FIG. 5 shows an example in which a user has selected the selectable element 410 associated with the suggested response "Sure, how about 10:30 AM?" In response to selecting the selectable element 410, the portable electronic device 100 sends a text-based communication 502 that includes the suggested response, "Sure, how about 10:30 AM?"

FIG. 6 shows another example in which the suggested response is sent as a modified confirmation indication, rather than a reply text-based communication. FIG. 6 shows a portable electronic device 600 of the sender of the text-based communication 402 shown in FIG. 4. The portable electronic device 600 may be similar to portable electronic device 100 described above. The received text-based communication 602 and the sent text-based communication 604 displayed on the touch-sensitive display 118 of the portable electronic device 600 are associated with the text-based communications 208 and 402 displayed on the portable electronic device 100 shown in FIG. 4.

For the purpose of the example shown in FIG. 6, the selectable element 406 associated with suggested response "Yes" is selected on the portable electronic device 100 shown in FIG. 4. In response to the selection of selectable element 406, the portable electronic device 100 sends the suggested response to portable electronic device 600 as a confirmation. After receiving the confirmation from the portable electronic device 100, the portable electronic device 600 modifies a displayed confirmation indication 606 associated with the text-based communication 604 to "Yes". Thus, the confirmation indication 604 indicates the response sent from portable electronic device 100.

Figure 7:
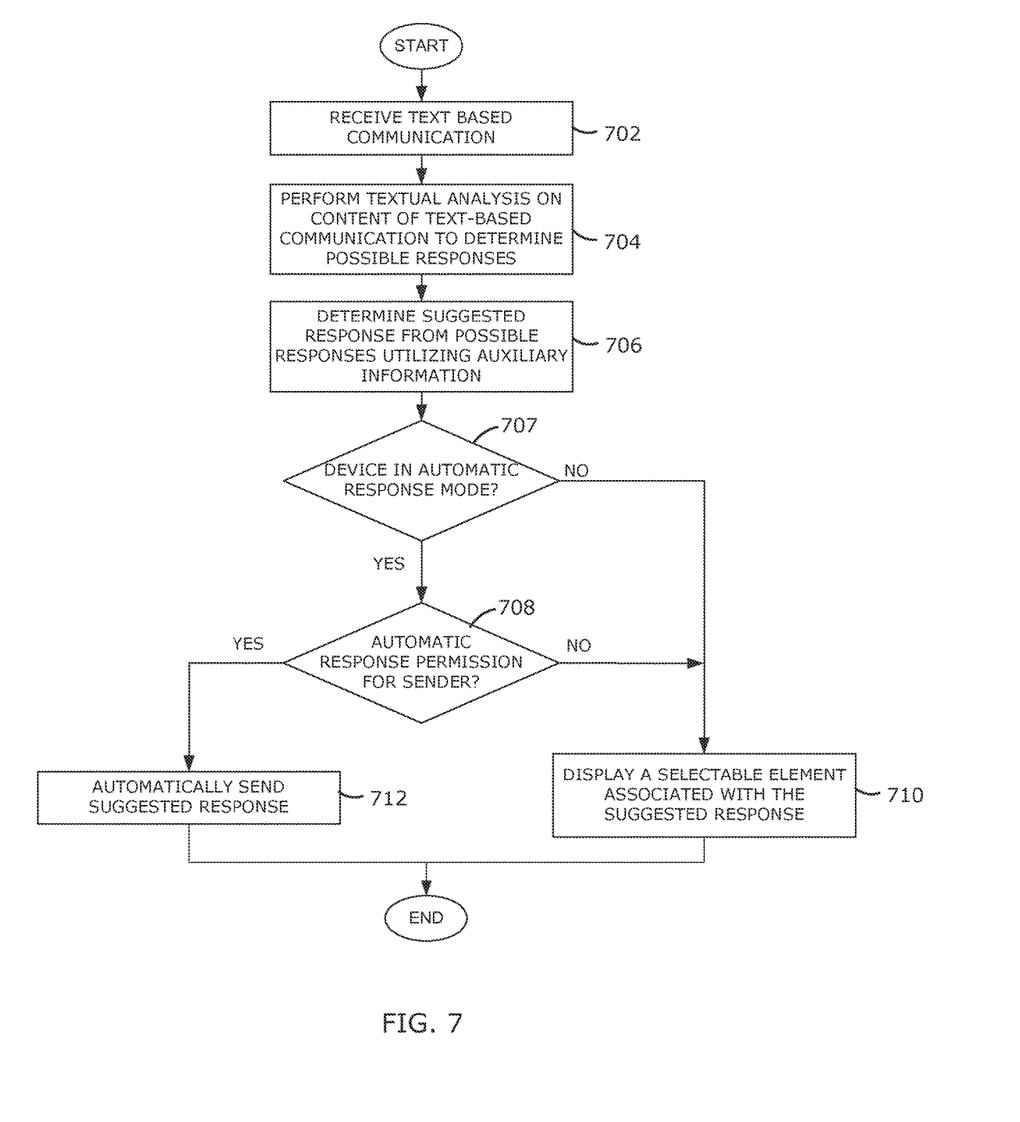
FIG. 7 is a flowchart illustrating a method of automatically sending a suggested response to text-based communications on the portable electronic device of FIG. 1 in accordance with another embodiment.

A flowchart illustrating a method of automatically sending a suggested response at a portable electronic device 100 is shown in FIG. 7. Steps 702-706 are similar to steps 302-306 of the method illustrated in FIG. 3 and are not further described herein.

Optionally, a determination of whether the portable electronic device 100 is in an automatic response mode is made at 707. The determination at 707 may be made based on auxiliary information. For example, the portable electronic device 100 may enter the automatic response mode when the device is paired with a navigation system of a vehicle, indicating that the user is driving. In another example, the portable electronic device 100 may enter into automatic response mode based on data stored in an events database associated with a calendar application to determine that the user is in a meeting. Alternatively, a user may initiate an automatic response mode manually utilizing settings options of the portable electronic device 100.

If the portable electronic device 100 is not in an automatic response mode, the method proceeds to 710 and a selectable element associated with the suggested response is displayed on the portable electronic device, similar to 308 of the method illustrated in FIG. 3.

If the portable electronic device 100 is in an automatic response mode, the method proceeds to 708 and a determination is made whether automatic response permission is associated with the sender of the received text-based communication. An automatic response permission may be associated with a sender by, for example, utilizing a settings function to set permissions in a contact profile associated with the sender. In another example, an automatic response permission may be associated with the sender by indicating in the contact profile associated with the sender that the sender is a spouse, or a parent, or has some other special relationship to the user of the portable electronic device 100. In another example, the automatic response permission may be associated with the sender by an explicit invitation from one user to another and acceptance of the invitation. In another example, the automatic response permission may be associated with the sender by inferring a special relationship with the sender based on, for example, a frequency in which the user receives or sends text-based communications, or other communications, with the sender. In an example of a smart device, an automatic response permission may be associated with the smart device when the portable electronic device 100 is paired with the smart device through, for example, Bluetooth™, NFC, or Wi-Fi.

If the determination at 708 is that no automatic response permission is associated with the sender, the method proceeds to 710 and a selectable element associated with the suggested response is displayed on the portable electronic device, similar to 308 of the method illustrated in FIG. 3.

If an automatic response permission is determined at 708, the method proceeds to 712 and the suggested response is automatically sent by the portable electronic device 100. Thus, a response may be automatically sent in response to a request from a sender for whom an automatic response permission is associated without any additional action from the user. If the user is driving, automatically sending a response facilitates responding to a request for information without distracting the user while he or she is driving.

Optionally, the suggested response may be automatically sent in response to identifying that the suggested response is informational and that no decision from the user is required. In an example, the textual analysis determines that the received text-based communication from a sender is a request for information such as a location of the user. The determined suggested response from the set of possible responses includes the current location of the portable electronic device 100. In this example, the suggested response is informational and is automatically sent without further input from the user, provided the sender of the original text-based communication is associated with an automatic response permission. In another example, the text-based communication received from a sender is a request to meet and the suggested responses include "yes" and "no". In this case, the suggested response is not informational and further input is required from the user to determine which suggested response to send. In this example, a suggested response is not automatically sent even if an automatic response permission is associated with the sender.

Figure 8:
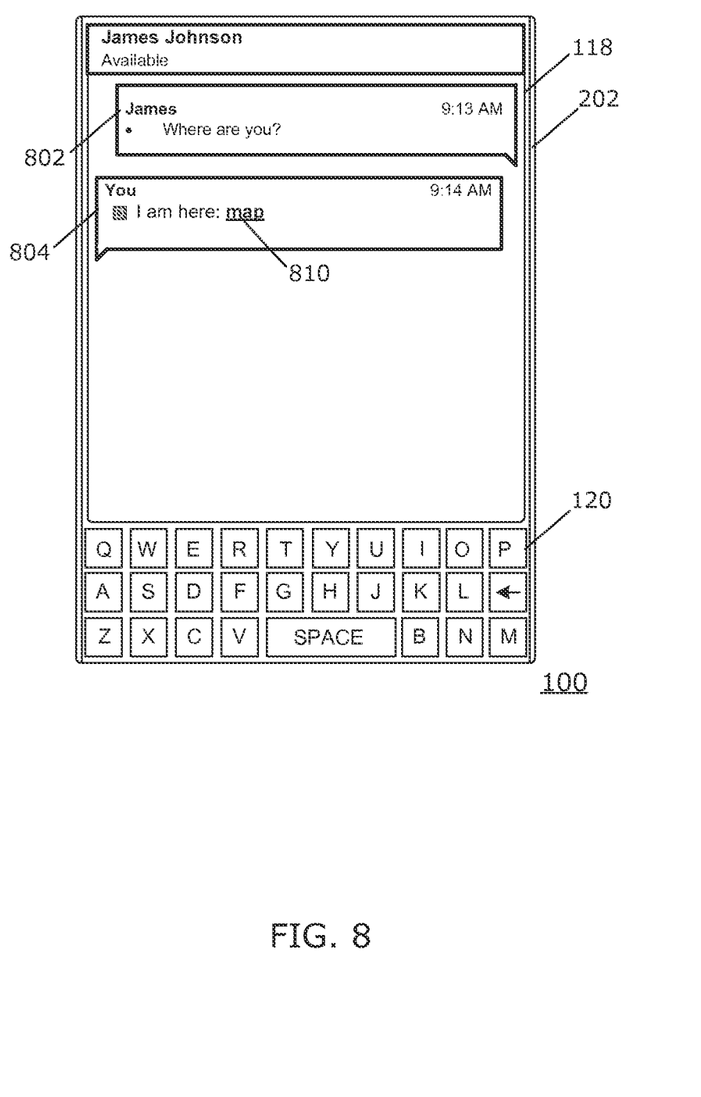
FIG. 8 illustrates an example of automatically sending a suggested response to text-based communications in accordance with the flowchart of FIG. 7.

Reference is made to FIG. 8 with continued reference to FIG. 7 to describe examples of automatically responding to text-based communications according to the method illustrated in FIG. 7.

A text-based communication 802 is received at the portable electronic device 100 at 702. The text-based communication 802 includes the content "Where are you?" The textual analysis performed at 704 determines a set of possible responses to the text-based communication 802. The set of possible responses may be, for example, the best available location of the portable electronic device 100. The textual analysis may also determine that the content of the received text-based communication asks a question, and that the question relates to the current location.

The portable electronic device 100 determines a suggested response from the set of possible responses at 706. The auxiliary information utilized is the current location of the portable electronic device 100 and the suggested response may be determined, for example, as the location of the portable electronic device 100 with best resolution, as discussed above.

In the present example, the auxiliary information related to the current location of the portable electronic device 100 is determined by for example, the GPS 135, or, if GPS 135 is not available, utilizing the IP address information of the portable electronic device 100.

Alternatively, or additionally, the current location may be determined by accessing personal information stored on the portable electronic device 100 such as, for example, data stored in an event database associated with a calendar application of the portable electronic device 100. In an example, the user may be in a meeting at the time that the text-based communication 802 is received. Data in the event database that is associated with the meeting may be utilized to determine a location of a meeting that a user is in at the time the text-based communication 802 is received. The location data associated with the meeting is then utilized as the current location of the portable electronic device 100.

The portable electronic device 100 determines that an automatic response permission is associated with the sender at 708. In response to determining the automatic response permission is associated with the sender, the suggested response is automatically sent to the sender as text-based communication 804 at 712. The text-based communication 804 shown in the example of FIG. 8 includes a hyperlink 806 to a map showing the current location of the portable electronic device 100 as determined by GPS 135. Alternatively, the suggested response may include an image of a map showing the current location, or may include a description of the current location such as, for example, a closest intersection to the portable electronic device 100.

Figure 9:
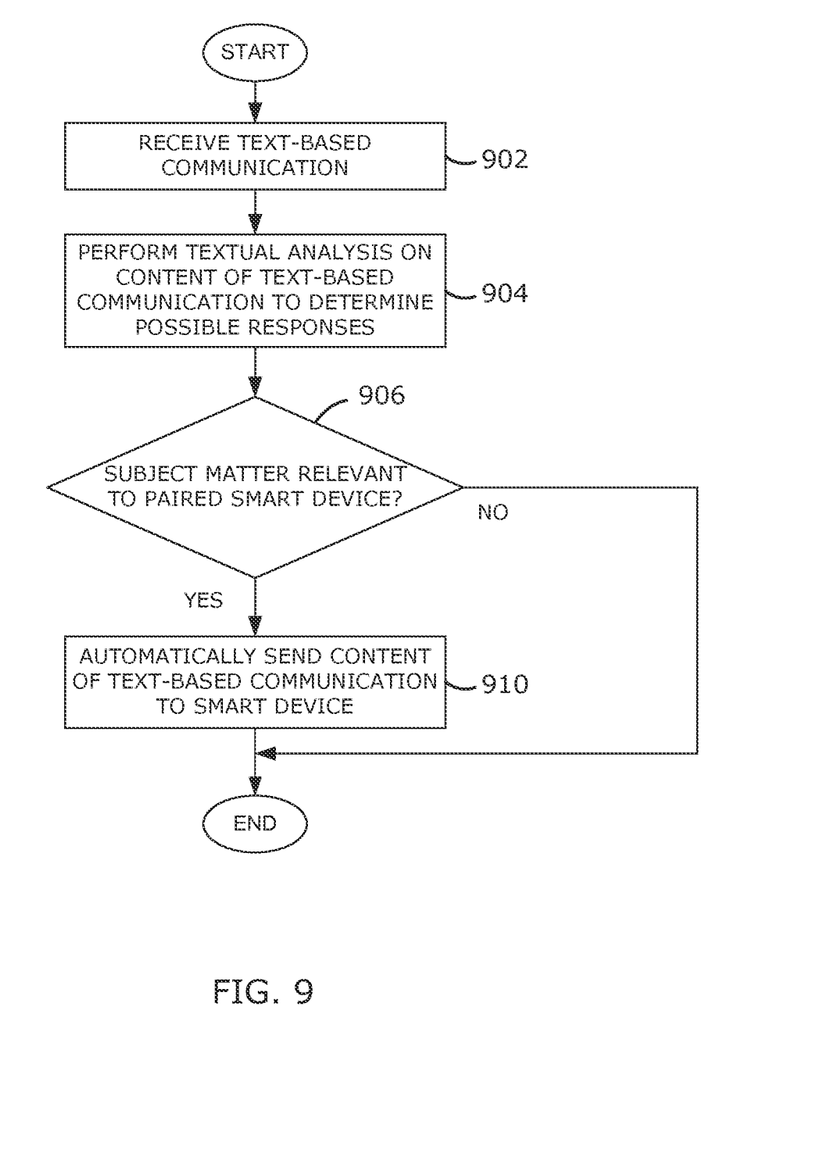
FIG. 9 is a flow chart illustrating a method of sharing information from a received text-based communication with a smart device paired with the portable electronic device of FIG. 1 in accordance with another embodiment.

A flowchart illustrating a method of sharing information from a received text-based communication with a smart device paired to an electronic device 100 is shown in FIG. 9. A text-based communication is received at the portable electronic device at 902. At 904, textual analysis is performed on the content of the text-based communication to determine a subject matter associated with the content of the received text-based communication. For example, the textual analysis may determine that the subject matter of the received text-based communication is related to a location, or is related to home automation. In addition, textual analysis may also determine possible responses, similar to steps 304 and 704 of the above described methods.

A determination is made at 906 whether the determined subject matter of the received text-based communication is relevant to a smart device paired to the portable electronic device 100. The smart devices paired with the portable electronic device 100 may be associated with categories of smart devices such as, for example, a navigation device category, or a home automation device category. The subject matter of the received text-based communication may be determined relevant to the paired smart device when the determined subject matter corresponds to the category associated with the smart device. For example, if the textual analysis determines that the received text-based communication relates to a specific location, the subject matter may be determined relevant to paired smart devices associated with a navigation device category such as, for example, a navigation system of a vehicle. In another example, if the textual analysis determines that the received text-based communication relates to home automation, the subject matter may be determined relevant to paired smart devices associated with a home automation device category such as, for example, a home automation system.

A category of a smart device may be pre-determined and stored in a smart device database accessible by the portable electronic device 100. For example, the smart device database may be a remote database that may be queried by the portable electronic device 100 via the network 150 to determine the category associated with a smart device. For example Bluetooth™ devices may send an identifier to the portable electronic device 100. The portable electronic device 100 may utilize that identifier to query a remote database for the category of the smart device.

If the determined subject matter of the text-based communication is determined to be relevant to a paired smart device at 906, the method continues at 312. At 312, the content, or a portion of the content, of the text-based communication is automatically sent to the paired smart device. Alternatively, a suggested response, determined similarly to the above-described methods, may be automatically sent to the paired smart device.

Figure 10:
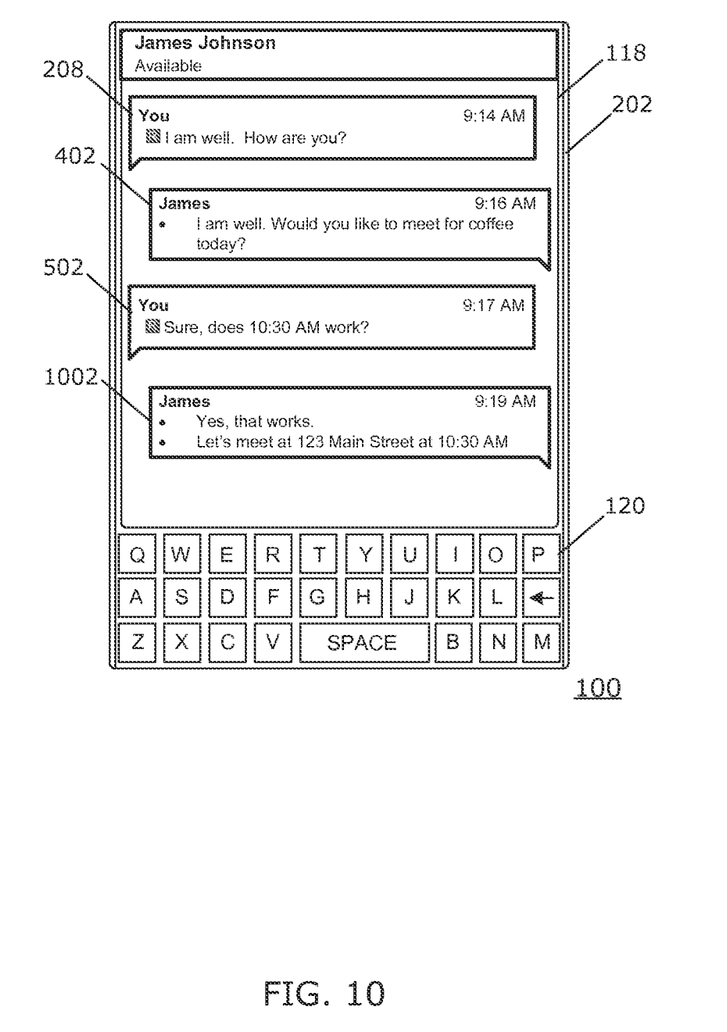
FIG. 10 illustrates an example of sharing information from a received text-based communication with a smart device in accordance with the flowchart of FIG. 9.

Reference is made to FIG. 10 with continued reference to FIG. 9 to describe examples of communication content information to a paired smart device according to the method illustrated in FIG. 9.

A written conversation is displayed on the touch-sensitive display 118 of the portable electronic device 100. The written conversation of the example shown in FIG. 10 continues from the written conversation of the example shown in FIG. 6. A text-based communication 1002 received at 902. The content of the received text-based communication 1002 includes an address for the discussed meeting, i.e. 123. Main Street. Textual analysis of the content of the text-based communication 1002 is performed at 904 to determine a subject matter of the text based communication. The determined subject matter for the text-based communication 1002 is that the text-based communication 1002 relates to a location of a meeting, namely 123 Main Street.

The portable electronic device 100 determines at 906 whether the subject associated with the received text-based communication 1002 is relevant to a smart device paired to the portable electronic device 100. In this example, the determined subject matter is a specific location, which is relevant to the navigation device category of smart devices. At 910, the portable electronic device 100 automatically sends the address of the meeting to a smart device associated with the navigation device category and that is paired with the portable electronic device 100. In the example shown in FIG. 10, the address 123 Main Street is sent to a vehicle navigation system (not shown) that is paired with the portable electronic device 100.

Sending the address of the meeting to the vehicle navigation system facilitates ready accessible to the address by the navigation system without any additional action taken by a user of the portable electronic device 100. For example, a user does not have to enter the address of the meeting into the navigation system of his or her vehicle before driving to the meeting.

Described herein are methods and devices for determining suggested responses to a text-based communication received at a portable electronic device. In the examples described above, textual analysis is performed on the content of a received text-based communication to determine a set of possible responses to the text-based communication. Suggested responses are determined from the set of possible responses by utilizing auxiliary information at the portable electronic device 100 to associate a probability with each possible response. A selectable element associated with the suggested response may be displayed on a display of a portable electronic device such that selecting the selectable element results in the portable electronic device sending the suggested response as a text-based communication or as a confirmation to the previously received text-based communication.

Optionally, a determination may be made whether an automatic response permission is associated with the sender and, if so, a suggested response may be automatically sent to the sender by the portable electronic device 100. The suggested response may be sent automatically when a determined subject matter of the text-based communication is one of predetermined subject matter. Optionally, suggested responses may be sent to a sender only when the device is in an automatic response mode. Automatically sending suggested responses facilitates quickly responding to a text-based communication without additional input from a user, improving a man-machine interface and reducing the power consumption of the portable electronic device.

Optionally, a subject matter of the text-based communication may be determined utilizing textual analysis. A determination is made whether the subject matter of the text-based communication is relevant to a smart device paired with the portable electronic device 100. If the subject matter is determined to be relevant to the paired smart device, the content, or a portion of the content, of the received text-based communication is automatically sent to the smart device. By sending content from the received text-based communication facilitates sharing relevant information between connected devices without further input from a user, and without a user referring back through a written conversation to a previously received text-based communications, reducing power consumed by the portable electronic device.

The scope of the claims should not be limited by the preferred embodiments set forth in the examples, but should be given the broadest interpretation consistent with the description as a whole.

What is claimed is:

1. A method of responding to a text-based communication and controlling a portable electronic device, the method comprising:
  receiving the text-based communication at the portable electronic device;
  performing textual analysis on the text-based communication to determine a set of possible responses;
  for each possible response of the set of possible responses, ranking the possible responses based at least on auxiliary information at the portable electronic device;
  selecting a first possible response as a suggested response based on the ranking of the possible responses;
  determining whether a sender of the received text-based communication is associated with an automatic response permission; and
  in response to determining the sender is associated with the automatic response permission, automatically sending the suggested response to the sender;
  wherein the sender of the received text-based communication is associated with the automatic response permission based on one of:
    setting the automatic response permission in a contact profile for the sender;
    indicating a special relationship in the contact profile of the sender;
    accepting an invitation from the sender for automatic response permission;
    inferring a special relationship with the sender; and when the sender is a smart device, determining that the smart device is paired with the portable electronic device.

2. The method according to claim 1, further comprising:
determining a probability associated with each of the possible responses of the set of possible responses based at least on the auxiliary information; and
wherein ranking the possible responses comprises ranking the possible Responses according the determined probabilities associated with the possible responses.

3. The method according to claim 1, wherein the auxiliary information is personal information stored on the portable eletronic device.

4. The method according to claim 3, wherein:
the text-based communication is a request for a meeting and each possible response of the set of possible responses includes a time for the meeting;
the auxiliary information includes availability based on events associated with a calendar application stored on the portable electronic device; and
selecting comprises selecting a suggested response by filtering the set of possible responses to include possible responses having times for the meeting that do not conflict with events associated with the calendar application.

5. The method according to claim 1, wherein the text-based communication is a request for a current location;
the auxiliary information is a location of the portable electronic device; and
the suggested response includes the location of the portable electronic device.

6. The method according to claim 1, comprising, performing textual analysis on the received text-based communication to determine a subject matter of the text-based communication;
determining that the subject matter is relevant to a smart device paired with the electronic device; and
automatically sending a portion of the content of the text-based communication to the smart device.

7. The method according to claim 6, wherein:
the text-based communication includes an address;
the smart device paired to the electronic device is a navigation device;
determining the subject matter includes determining that the subject matter is location based; and
automatically sending comprises sending the address to the navigation system paired to the electronic device.

8. A non-transitory computer-readable storage medium having computer-readable code executable by at least one processor of an electronic device to:
receive a text-based communication at the portable electronic device;
perform textual analysis on the text-based communication to determine a set of possible responses; and
for each possible response of the set of possible responses, rank the possible responses based at least on auxiliary information at the portable electronic device;
select a first possible response as a suggested response based on the ranking of the possible responses;
determine whether a sender of the received text-based communication is associated with an automatic response permission; and
in response to determining the sender is associated with the automatic response permission, automatically send the suggested response to the sender;
wherein the sender of the received text-based communication is associated with the automatic response permission based on one of:
setting the automatic response permission in a contact profile for the sender;
indicating a special relationship in the contact profile of the sender;
accepting an invitation from the sender for automatic response permission;
inferring a special relationship with the sender; and
when the sender is a smart device, determining that the smart device is paired with the portable electronic device.

9. A portable electronic device comprising:
a communication system for sending and receiving text-based communications;
a display for displaying information including received text-based communications;
a processor coupled to the communication system and the display and programmed to:
receive a text-based communication at the portable electronic device;
perform textual analysis on the text-based communication to determine a set of possible responses;
for each possible response of the set of possible responses, rank the possible responses based at least on auxiliary information at the portable electronic device;
select a first possible response as a suggested response based on the ranking of the possible responses;
determine whether a sender of the received text-based communication is associated with an automatic response permission; and
in response to determining the sender is associated with the automatic response permission, automatically send the suggested response to the sender;
wherein the sender of the received text-based communication is associated with the automatic response permission based on one of:
setting the automatic response permission in a contact profile for the sender;
indicating a special relationship in the contact profile of the sender;
accepting an invitation from the sender for automatic response permission;
inferring a special relationship with the sender; and
when the sender is a smart device, determining that the smart device is paired with the portable electronic device.

10. The portable electronic device according to claim 9, wherein the processor is programmed to:
determine a probability associated with each of the possible responses of the set of possible responses based at least on the auxiliary information; and
wherein ranking the possible responses comprises ranking the possible responses according the determined probabilities associated with the possible responses.

11. The portable electronic device according to claim 9, wherein the auxiliary information is personal information stored on the portable electronic device.

12. The portable electronic device according to claim 11, wherein:
the text-based communication is a request for a meeting and each possible response of the set of possible responses includes a time for the meeting;

the auxiliary information includes availability based on events associated with a calendar application stored on the portable electronic device; and selecting comprises selecting a suggested response by filtering the set of possible responses to include possible responses having times for the meeting that do not conflict with events associated with the calendar application.

13. The portable electronic device according to claim 9 wherein:

the text-based communication is a request for a current location;

the auxiliary information is a location of the portable electronic device; and the suggested response includes the location of the portable electronic device.

14. The portable electronic device according to claim 9, wherein the processor is programmed to:

perform textual analysis on the received text-based communication to determine a subject matter of the text-based communication;

determine that the subject matter is relevant to a smart device paired with the electronic device; and automatically send a portion of the content of the text-based communication to the smart device.

15. The portable electronic device according to claim 14, wherein:

the text-based communication includes an address;

the smart device paired to the electronic device is a navigation device;

determining the subject matter includes determining that the subject matter is location based; and automatically sending comprises sending the address to the navigation system paired to the electronic device.

\* \* \* \* \*